Patented Aug. 5, 1930

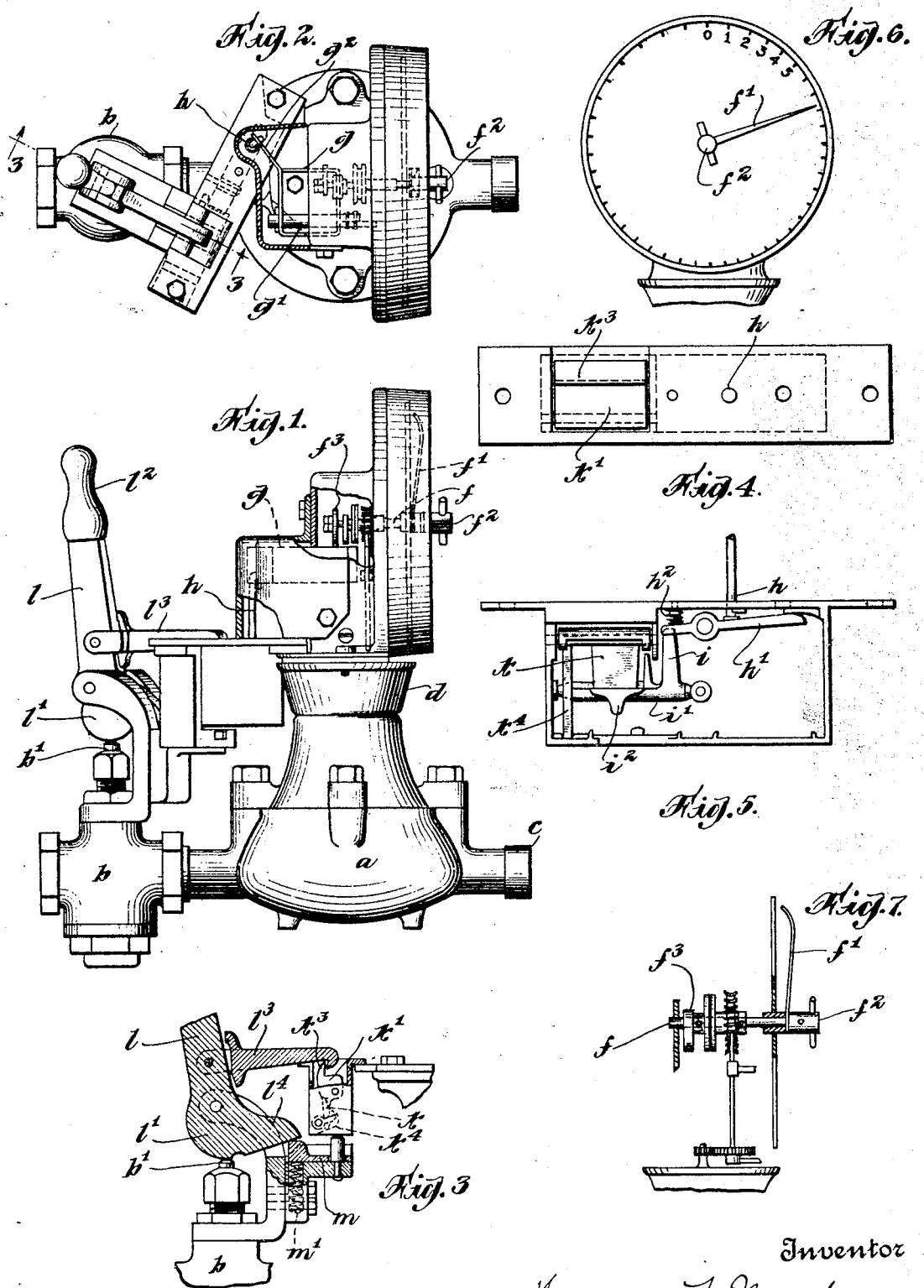

1,772,260

UNITED STATES PATENT OFFICE

WILLIAM L. MARDEN, OF ELMHURST, NEW YORK, ASSIGNOR TO NEPTUNE METER COMPANY, OF NEW YORK, N. Y., A CORPORATION OF NEW JERSEY

CUT-OFF FOR METERS

Application filed July 10, 1928. Serial No. 291,614.

In some of the industrial arts it is desirable that a measured quantity of a liquid shall be delivered and that the flow of the liquid shall then be cut off. Ordinarily the attendant observes the indication of the register which is actuated by the meter and, when the required quantity of liquid has passed the meter, operates by hand a valve to stop the flow. It is the object of the present invention to provide means whereby the cut-off valve shall be actuated automatically when the required quantity of liquid has passed the meter. In accordance with the invention there is included in the register mechanism, which is actuated by the meter, an element, capable of being set to any desired position, as determined by the quantity of liquid to be delivered, which, when the predetermined quantity of liquid has passed through the meter, brings about the operation of the cut-off valve to stop the flow of the liquid. The invention will be more fully explained hereinafter with reference to the accompanying drawings in which it is illustrated as associated with a meter registering mechanism and a cut-off valve of known construction, and in which:

Figure 1 is a view in elevation of such a structure as that referred to, some parts of the casing being broken out to show details of construction.

Figure 2 is a view of the same as seen from above, with a portion of the casing in section on the plane indicated by the broken line 2—2 of Figure 1.

Figure 3 is a detail view partly in section on the plane indicated by the broken line 3—3 of Figure 2.

Figure 4 is a view as seen from above of the releasing device.

Figure 5 is a view in side elevation of the releasing device, the side of the casing being removed.

Figure 6 is a view in elevation of the register dial as seen from the right hand in Figure 2.

Figure 7 is a detail view of so much of the register mechanism as is necessary to enable the application of the invention to be understood.

In the embodiment of the invention illustrated in the drawing there is indicated at $a$ a meter of well known construction to which the liquid to be measured is conducted through a spring operated cut-off valve $b$ of known construction, the meter having an outlet at $c$. With the meter is associated at $d$ the usual register mechanism through which is actuated by suitable intermediate mechanism, also of usual construction, the shaft $f$ of the dial indicator $e$. All of the parts thus far referred to may be of any usual or suitable construction and arrangement, the details of which form no part of the present invention.

The shaft $f$ carries an indicator pointer $f^1$ and a knob or a handle $f^2$ by which the shaft $f$ can be rotated to set the pointer $f^1$ at any desired point on the scale of the dial, indicating the point at which the flow of the liquid through the cut-off valve is to be stopped. Rotation of the shaft $f$, which is frictionally driven by the meter, determines the point at which the cut-off valve $b$ shall operate to stop the flow of the liquid. As a convenient means by which this function is accomplished, the shaft $f$ is shown as having fixed thereon a cam $f^3$ which cooperates with one member of a bail $g$, pivotally mounted on a spindle $g^1$ and provided with an arm $g^2$. This arm is shown as overlying a plunger $h$ which rests at its lower end on one arm of a spring-pressed latch $h^1$, the other arm being held normally by a spring $h^2$ in the path of an arm $i$ of a spindle $i^1$. The spindle $i^1$ carries a stop $i^2$ which normally engages the tail $k$ of a detent $k^1$ and holds the detent from movement so long as the latch $h^1$ stands in the path of the arm $i$, movement of the detent $k^1$ being possible when the latch $h^1$ is out of the path of the arm $i$. The detent $k^1$ has a lip $k^3$ and is returned to normal, locking position by a spring $k^4$. The locking and releasing device just described is also a known form of locking and releasing device and has been selected for illustration and description merely as a convenient form.

The cut-off valve $b$, already referred to as of known construction, has a spring-pressed plunger $b^1$ which must be held down to keep the valve open. When the plunger is relieved of pressure and rises the valve closes. In the arrangement shown the position of the plunger and therefore the opening and closing of the valve, is determined by a lever $l$ provided with a cammed heel $l^1$ for cooperation with the plunger $b^1$. The lever $l$ may be provided with a handle $l^2$ for manual operation, when required, and it is also provided with a latch $l^3$ for engagement with the lip $k^3$ of the detent $k^1$ for the purpose of holding the lever, until the detent is released, in such position that the valve $b$ will be held open by the cammed heel $l^1$. For the purpose of starting the lever $l$ from its nearly vertical position, indicated in Figures 1 and 3, if the lever is not sufficiently over-balanced to insure immediate movement when it is released, the lower portion of the lever below its pivot is extended as a toe $l^4$ for cooperation with a starter $m$ which is loosely mounted on the supporting frame and is pressed upward by a spring $m^1$.

It will now be understood that when the cam $f^3$ of the indicator shaft $f$ has been moved by the meter to an extent determined by the previous setting of the shaft by the knob $f^2$, the plunger $h$ will be acted upon by the cam to release the detent $k$ and therefore release the lever $l$ for movement by its own weight or by the starter $m$, thereby permitting the cut-off valve to close and stop the flow of liquid through the meter.

It will be obvious, not only that various forms of meter, registering mechanism, indicating device, tripping device, releasing device, and cut-off valve may be used as may suit the convenience of the manufacturer or the user, but that various changes may be made in the construction and arrangement shown and described herein without departing from the spirit of the invention except that so far as the same is set forth in the accompanying claim.

I claim as my invention:

In combination with a meter, a self-closing valve operable to stop the flow of fluid through the meter, means to maintain the valve in open position and to permit it to close upon a predetermined flow of fluid comprising a lever to move the valve, a latch attached to the lever, a detent cooperating with the latch to hold it in the desired position approximately at right angles to the lever, a second detent cooperating with the first detent to hold it in the desired position, a cam actuated by the meter, and operative connections between the cam and the second detent, whereby the lever is released by the meter.

This specification signed this 6th day of July, A. D. 1928.

WILLIAM L. MARDEN.